May 5, 1931.  O. L. SKOPIK  1,804,185
BRAKE
Filed Sept. 26, 1927  2 Sheets-Sheet 1
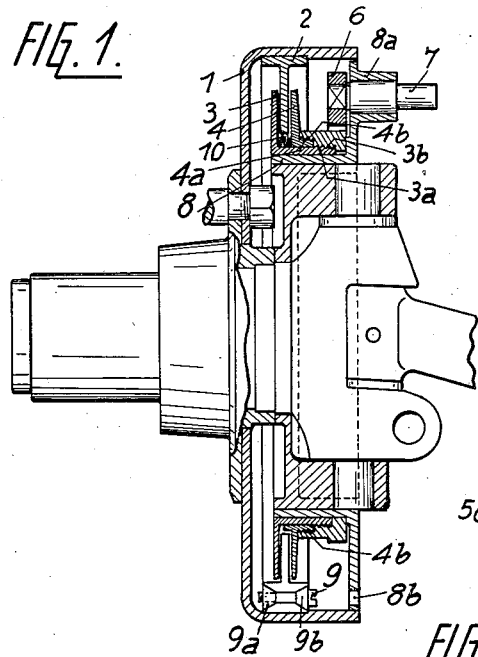
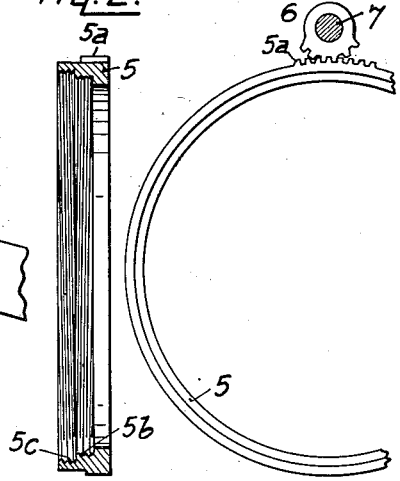
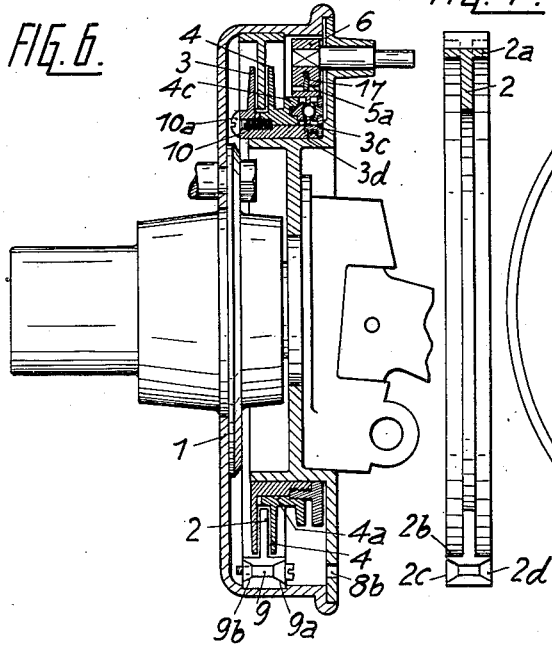
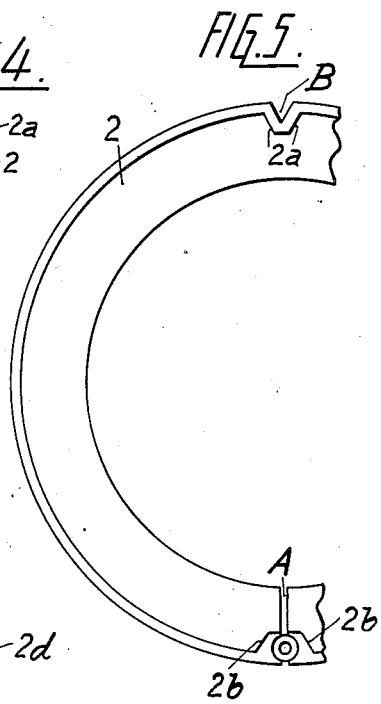

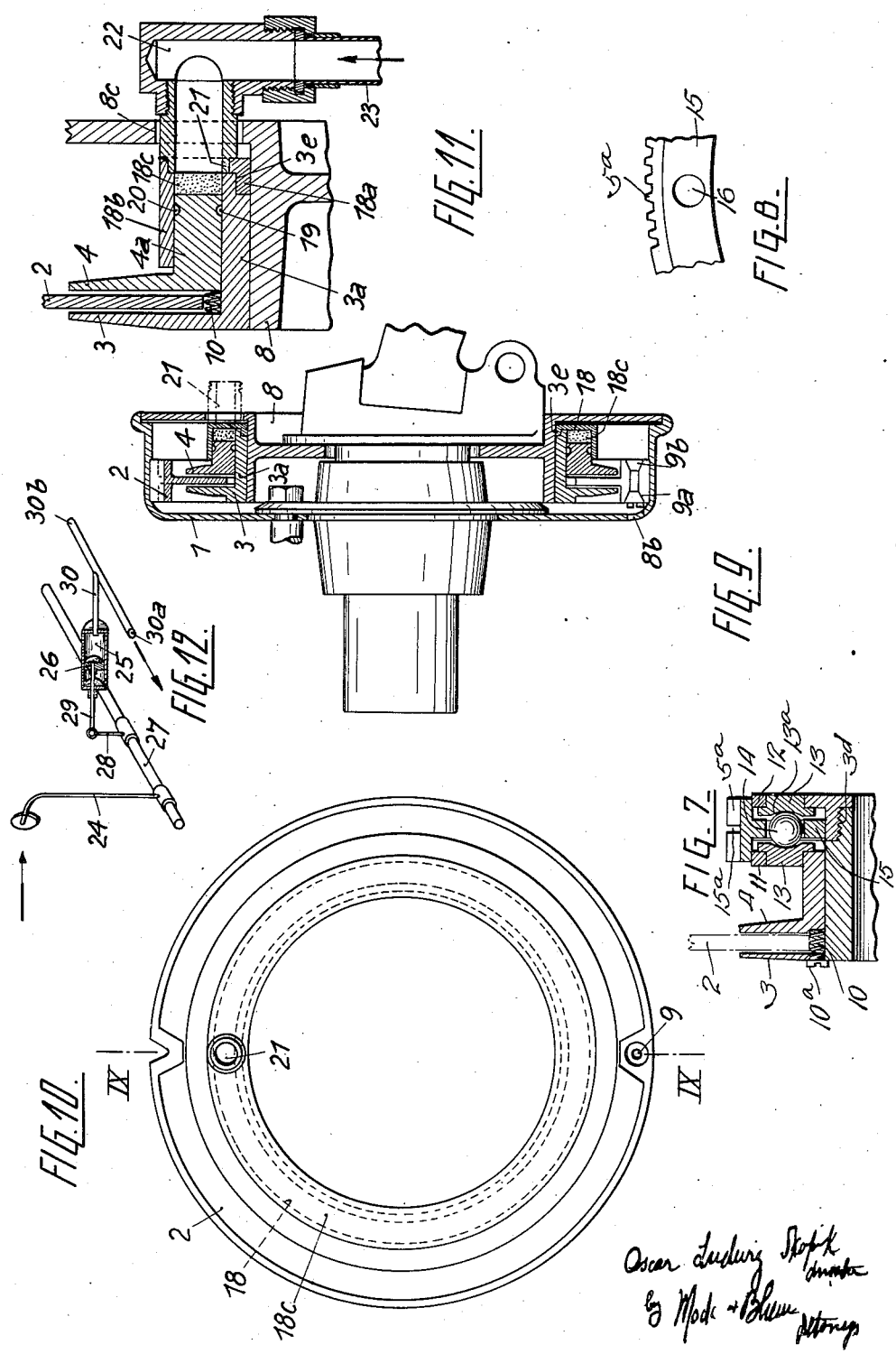

Patented May 5, 1931

1,804,185

UNITED STATES PATENT OFFICE

OSKAR LUDWIG SKOPIK, OF BERLIN, GERMANY

BRAKE

Application filed September 26, 1927, Serial No. 221,910, and in Germany April 8, 1927.

This invention relates to brakes acting on the inside of the drum and may be employed in every case where it is desired to secure a very high braking effect in a restricted space, especially at the inside of the wheels of motor cars. The improved brake consists of three flat rings concentrically arranged with respect to the same axis. The intermediate ring is connected to the rotatable drum to be braked. The two other rings are arranged at opposite sides of the intermediate ring, and they are prevented from revolving and are to be engaged with and disengaged from the opposite sides of the intermediate ring, by means of an actuating gear.

In the accompanying drawings:

Fig. 1 is a longitudinal sectional view of a first form of a brake embodying my invention;

Fig. 2 is a longitudinal sectional view of the actuating member shown in Fig. 1;

Fig. 3 is a side view of the member shown in Fig. 2 and of a gear engaging the same, seen from the lefthand side of Fig. 2;

Figs. 4 and 5 are respectively a longitudinal sectional view and a side view of the intermediate ring shown in Fig. 1;

Fig. 6 is a longitudinal sectional view similar to Fig. 1, but showing a second form of the improved brake;

Figs. 7 and 8 are, on a larger scale, a longitudinal sectional view and a side view of the form shown in Fig. 6;

Fig. 9 is a longitudinal sectional view similar to Figs. 1 and 6, but showing a third form of the improved brake. This is a section of the line IX—IX of Figure 10;

Fig. 10 is a side view of the third embodiment of the brake, viewed from the righthand side of Fig. 9;

Fig. 11 is a fragmentary longitudinal sectional view identical with the upper part of Fig. 9, but shown on a larger scale; and Fig. 12 is a perspective view showing the arrangement of parts adjacent the brake pedal.

Referring to Figs. 1 to 5, a brake ring 2, preferably T-shaped in cross section, is secured within the brake drum 1 fixed at the inside of the wheel (not shown) which is to be braked. The ring 2 may be formed of metal (preferably cast iron) or of vulcanized fibre, leather or other suitable material. The ring 2 rotates together with the drum 1. Two other rings 3 and 4 are arranged at opposite sides of the radial wall of the ring 2. The ring 3 is L-shaped in section, and is (together with its peripheral flange 3a located below the ring 2), axially slidable but not rotatable upon a carrying ring 8. The ring 4 is also L-shaped in section and is (together with its peripheral flange 4a), axially slidable but not rotatable upon the flange 3a of the ring 3. The flange 3a projects beyond the flange 4a and has a peripheral screw thread 3b upon its outside. The flange 4a is directed to the same side as the flange 3a and has a peripheral screw thread 4b upon its outside. One of the threads 3b and 4b is right-handed and the other left-handed. An adjusting ring 5 having corresponding threads 5b and 5c is screwed upon the two flanges 3a and 4a and is rotatably mounted upon the carrying ring 8. The ring 5 has, upon a part of its periphery, a rack 5a adapted to be engaged by a pinion or toothed segment 6, the shaft 7 of which is rotatably mounted in an eye 8a formed on the carrying ring 8.

The projecting outer end of the shaft 7 carries a lever (not shown). By operating this lever the two rings 3 and 4 are oppositely slid in such manner that the rings 3 and 4, upon being urged towards each other clamp the ring 2 between them and produce a frictional and a very effective braking moment. It is to be observed that the axial pressures exerted upon the ring 2 and also the axial pressures exerted upon the adjusting ring 5 are balanced, provided, that the adjusting ring 5 is permitted to slide a little upon the carrying ring 8. The frictional energy is transformed into heat which will be distributed by metallic conduction upon the adjoining members having large radiating surfaces. For increasing the radiating effect, the brake drum 1 may be provided with ribs at its outer surface.

In order to clamp the ring 2 within the drum 1, the ring 2 is slitted at A. At the opposite side the ring 2 has a recess B formed in such manner that two portions 2a of the peripheral wall of the ring 2 form a V-shaped recess. By this means the T-shaped section of the ring 2 is diminished at the point B, forming thereby a pivot structure facilitating the clamping. Furthermore the recess make it possible to insert a tool so that, after loosening the clamping device, a first loosening movement can be given to the ring 2 within the drum 1 and thereby free the ring 2.

At both sides of the slit A the ring 2 is reinforced. The reinforcements 2b are provided, in each of its halves, with opposite frustro-conical recesses 2c and 2d which complement each other. Within these recesses a correspondingly conical nut 9a and a correspondingly conical washer 9b are inserted to be drawn each against each other by means of a headed screw bolt 9. A hole 8b is provided in the ring 8 for the insertion of the headed screw bolt and a wrench engaging the bolt head. By tightening the screw bolt the halves of the ring 2 are moved apart and the ring 2 is thus clamped within the drum 1.

In order to compensate any lost motion in the adjusting device provided with righthand and lefthand threads 3b 4b, which could permit an undesired engagement of the intermediate ring 2 by the two outer rings 3 and 4, compression springs 10 are inserted between the rings 3 and 4.

The effective friction surface of the brake specified is approximately three hundred and fifty per cent of an equally large two cheek brake of the usual construction. Accordingly a much higher braking effect is attained, the engaging pressure being much smaller; hence the increase of the temperature is much smaller and the device has much longer life. Furthermore the braking drum 1 does not be strained by radial forces and it may be made very light. Due to the high braking efficiency the servo-effect used by many other brakes need not be provided even if a very great braking effect is required and the front wheels, which carry a small load, are to be braked.

Referring to the second form shown in Figs. 6 to 8, the ring 4 is, at the outer end of its peripherical wall 4a, provided with a flange 4c integral with the wall 4a. The ring 3 has on its projecting portion a screw thread 3d whereon a ring 3c L-shaped in section is screwed and secured. The flange 4c and the ring 3c form opposite walls wherein holes 11 and 12 are provided, each being adapted to receive a flanged hardened steel pan member 13 having a recess 13a. Between each two oppositely arranged such steel members a steel ball 14 is inserted to project from both recesses. The balls are held in perforations 16 of an adjusting cage ring 15 T-shaped in section.

The ring 15 is formed with the rack 5a specified in connection with Figs. 2 and 3. But this rack is made in two portions separated from each other by means of a groove 15a, as clearly shown in Fig. 7. This groove is engaged by a segment 17 inserted into the pinion 6, as clearly shown in Fig. 6. This segment does not have teeth but rolls freely within the groove 15a. The parallel side faces of the segment 17 form stops to permit little axial play to the ring 15 and to hold the same between predetermined limits in its axial position.

In their normal position in which no braking takes place, the two rings 3 and 4 are separated by a plurality of peripherally disposed compression springs 10, as clearly shown in Fig. 7. Holes for inserting the springs 10 are provided in the ring 3 and each of said holes is closed by a head screw. By this arrangement the steel balls are caught between pairs of opposite steel members 13. In the normal position the width of the gap between the engaging surfaces of the rings 2 and 3, and the width of the gap between the engaging surfaces of the rings 2 and 4, are exactly or substantially equal, because of the cooperation of the segment 17 and the springs 10. When the ring 15 is turned by pinion 6, the balls 14 are driven toward the thicker edge portions of the pan members 13. The driven balls act upon the rings 3 and 4 in such a way that the ring 2 is frictionally engaged at both sides. The side play permitted by the segment 17 provides for full compensation of the pressures on the ring 2.

In the embodiment shown in Figs. 9 to 12 the axial movement of the outer rings 3 and 4 is produced by hydraulic means, the flange 4a of the ring 4 being formed with its full peripheral extension and its full radial width as an hydraulic piston of ring-shaped section. The great area of such a ring piston renders it possible to use a very small pressure at the brake pedal and to distribute the braking effect over two or four wheels, no balancing levers being needed as usual in mechanical brake systems for a plurality of wheels.

The peripheral flange 3a of the ring 3 has, at the inside of its outer edge a shoulder 3e over which the inner flange 18a of a ring 18 is pressed. The ring 18 has also an outer flange 18b which together with the flange 3a of the ring 3, forms the walls of a cylinder having a circular ring-shaped chamber 18c wherein the ring flange 4a which constitutes a piston, reciprocates. Packings 19 and 20 provided at the inside and outside of the flange 4a produce a tight fit of flange 4a within chamber 18c. The chamber 18c is completely and permanently filled with oil.

At a suitable point of its periphery the ring 18 is provided with an oil inlet nozzle 21 to which a connecting member 22 and a tube 23 are connected. The nozzle 21 is passed through a perforation 8c of the carrying ring 8.

As shown in Fig. 11, the outer ring 18 is connected with ring 3, because the inner flange 18a is pressed over the shoulder 3e, so that said ring 18 and the ring 3 move together. The nozzle 21 is connected to ring 18 so that they move together, and nozzle 21 and tube 22 are connected so that they move together. When pressure is applied to the oil, in the direction of the arrow shown in Fig. 11, said pressure acts to move ring 4 towards the left, and the reaction of said pressure acts to move pipe 22, nozzle 21, ring 18 and ring 3, to the right.

Near the brake pedal 24 an oil cylinder 25 is arranged wherein a piston 26 reciprocates. The brake pedal 24 is carried by a shaft 27 carrying also a lever 28 connected by means of a link bar 29 to the piston 26. The cylinder 25 is connected with a tube 30 connected to two tubes 30a and 30b either of them being connected with the tube 23 of the wheel brake at either car side.

When the brake pedal 24 is pressed forward, a small quantity of oil is transferred from the oil cylinder 25 in the direction to the oil chambers 18c whereby the oil pressure, operating on the whole ring-shaped section of the flange 4a, drives the rings 3 and 4 against the ring 2, the pressure of the springs 10 interposed between the said rings being overcome.

After the brake pedal is released, the springs 10 return the rings 3 and 4, the oil being returned into the cylinder 25 whereby the brake pedal 24 is returned to its original position.

The pressure fluid acts on one side against the ring section of the flange 4a and on the other side against the ring 18, the pressures exactly compensating each other. Since the ring flange section is very great, extraordinarily small fluid pressures are sufficient, even if all the four car wheels must be braked from the same pedal 24.

What I claim is:

1. In an internal brake, the combination of a brake drum, an intermediate ring located within the said brake drum and connected thereto, additional non-turnable rings located within the said drum upon opposite sides of the said intermediate ring, the said rings being disposed about the same axis, and operating means adapted to cause the additional rings to frictionally bear against the intermediate ring, said operating means comprising a cylinder connected to one of said additional rings, and a piston located within said cylinder and connected to the other of said additional rings.

2. In an internal brake, the combination of a brake drum, an intermediate ring located within said brake drum and having its outer periphery connected to the said drum to turn therewith, an inner non-turnable ring and an outer non-turnable ring located on opposite sides of the intermediate ring, the inner ring having a flange extending through the intermediate ring, a cylinder secured to said flange and located beyond the outer ring and a piston connected to the outer ring and located within the said cylinder.

3. In an internal brake for a wheel, the combination of an intermediate ring and two outer rings, all said rings having a common axis, the intermediate ring being connected to the wheel structure to turn therewith, means adapted to prevent the outer rings from turning with the wheel, a cylinder structure connected to one of said outer rings to move in unison therewith, the other of said outer rings having a piston-like extension fitting within said cylinder structure, and means adapted to force fluid under pressure into said cylinder structure to cause said outer rings to be simultaneously actuated towards the intermediate ring.

4. In an internal brake for a wheel having a drum, a split ring located within said drum and having its periphery in contact with the inner surface of said drum, and means adapted to expand said ring at the slitted part thereof to clamp it against the inner wall of said drum.

5. In an internal brake for a wheel having a drum, a ring located within said drum, and having a single slit which extends completely through said ring, the outer edge of said ring being in contact with the inner edge of said drum, and means adapted to expand said ring at the slitted part thereof in order to clamp said ring frictionally against the inner wall of said drum.

In testimony whereof I have signed this specification.

OSKAR LUDWIG SKOPIK.

DISCLAIMER 1,804,185.—*Oskar Ludwig Skopik*, Berlin, Germany. BRAKE. Patent dated May 5, 1931. Disclaimer filed February 9, 1935, by the patentee.

The claims which I herewith disclaim are in the following words, to wit:—

"1. In an internal brake, the combination of a brake drum, an intermediate ring located within the said brake drum and connected thereto, additional non-turnable rings located within the said drum upon opposite sides of the said intermediate ring, the said rings being disposed about the same axis, and operating means adapted to cause the additional rings to frictionally bear against the intermediate ring, said operating means comprising a cylinder connected to one of said additional rings, and a piston located within said cylinder and connected to the other of said additional rings.

"2. In an internal brake, the combination of a brake drum, an intermediate ring located within said brake drum and having its outer periphery connected to the said drum to turn therewith, an inner non-turnable ring and an outer non-turnable ring located on opposite sides of the intermediate ring, and the inner ring having a flange extending through the intermediate ring, a cylinder secured to said flange and located beyond the outer ring and a piston connected to the outer ring and located within the said cylinder.

"3. In an internal brake for a wheel, the combination of an intermediate ring and two outer rings, all said rings having a common axis, the intermediate ring being connected to the wheel structure to turn therewith, means adapted to prevent the outer rings from turning with the wheel, a cylinder structure connected to one of said outer rings to move in unison therewith, the other of said outer rings having a piston-like extension fitting within said cylinder structure, and means adapted to force fluid under pressure into said cylinder structure to cause said outer rings to be simultaneously actuated towards the intermediate ring."

[*Official Gazette March 12, 1935.*]